US010939483B2

(12) United States Patent
Watfa et al.

(10) Patent No.: US 10,939,483 B2
(45) Date of Patent: Mar. 2, 2021

(54) OPTIMIZATIONS FOR PROSE COMMUNICATIONS

(71) Applicant: INTERDIGITAL PATENT HOLDINGS, INC., Wilmington, DE (US)

(72) Inventors: Mahmoud Watfa, Saint Leonard (CA); Guanzhou Wang, Brossard (CA); Saad Ahmad, Montreal (CA); Amir Helmy, Vancouver (CA); Loic Canonne-Velasquez, Verdun (CA); Dimitrios Karampatsis, Ruislip (GB); Samian Kaur, Plymouth Meeting, PA (US); Ulises Olvera-Hernandez, London (GB)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 0 days.

(21) Appl. No.: 16/524,418

(22) Filed: Jul. 29, 2019

(65) Prior Publication Data

US 2020/0029373 A1 Jan. 23, 2020

Related U.S. Application Data

(63) Continuation of application No. 15/516,194, filed as application No. PCT/US2015/053833 on Oct. 2, 2015, now Pat. No. 10,368,375.

(Continued)

(51) Int. Cl.
*H04W 8/00* (2009.01)
*H04L 12/26* (2006.01)
(Continued)

(52) U.S. Cl.
CPC .......... *H04W 76/11* (2018.02); *H04L 43/028* (2013.01); *H04W 8/005* (2013.01); *H04W 28/06* (2013.01);
(Continued)

(58) Field of Classification Search
CPC ..... H04W 76/11; H04W 28/06; H04W 28/24; H04W 76/23; H04W 76/14; H04W 8/005; H04W 28/22; H04W 88/08; H04L 43/028
(Continued)

(56) References Cited

U.S. PATENT DOCUMENTS 9,380,623 B2 6/2016 Kim et al.
2012/0213072 A1* 8/2012 Kotecha ............ H04W 28/0268
370/235

(Continued)

FOREIGN PATENT DOCUMENTS

CN 103188742 A 7/2013

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.3.0 (Sep. 2014).

(Continued)

*Primary Examiner* — Marcos Batista
(74) *Attorney, Agent, or Firm* — Volpe Koenig

(57) ABSTRACT

A method of communicating using proximity services (ProSe) is disclosed. A base station receives at least one aggregate maximum bit rate (AMBR) parameter from a network entity. The at least one AMBR parameter comprises a maximum bit rate that a first wireless transmit/receive unit (WTRU) can use for data sent on one or more ProSe bearers. The base station receives a request from the first WTRU to establish the one or more ProSe bearers with a second (Continued)

WTRU. The request comprises priority information of the one or more ProSe bearers determined by the first WTRU. The base station sends an indication to the first WTRU to establish a ProSe communication over the one or more ProSe bearers based on at least the AMBR parameter and the priority information of the one or more ProSe bearers.

20 Claims, 8 Drawing Sheets

Related U.S. Application Data

(60) Provisional application No. 62/059,608, filed on Oct. 3, 2014.

(51) Int. Cl.
*H04W 28/06* (2009.01)
*H04W 28/22* (2009.01)
*H04W 28/24* (2009.01)
*H04W 76/11* (2018.01)
*H04W 76/14* (2018.01)
*H04W 76/23* (2018.01)
*H04W 88/08* (2009.01)

(52) U.S. Cl.
CPC ........... *H04W 28/22* (2013.01); *H04W 28/24* (2013.01); *H04W 76/14* (2018.02); *H04W 76/23* (2018.02); *H04W 88/08* (2013.01)

(58) Field of Classification Search
USPC .......................................... 455/450; 370/338
See application file for complete search history.

(56) References Cited

U.S. PATENT DOCUMENTS

| | | |
|---|---|---|
| 2012/0300712 A1 | 11/2012 | Hakola et al. |
| 2013/0287012 A1 | 10/2013 | Pragada et al. |
| 2013/0288668 A1 | 10/2013 | Pragada et al. |
| 2014/0162633 A1* | 6/2014 | Hwang ................. H04W 8/005 455/426.1 |
| 2014/0254476 A1 | 9/2014 | Blankenship et al. |
| 2014/0335791 A1 | 11/2014 | Kim et al. |
| 2015/0305012 A1 | 10/2015 | Yi et al. |
| 2015/0382142 A1 | 12/2015 | Kim et al. |
| 2016/0165414 A1* | 6/2016 | Lee ....................... H04W 36/30 370/331 |

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.7.0 (Sep. 2015).

Brouwer, "QoS in LTE: PSCR Demo Days," Alcatel-Lucent, pp. 1-34 (Dec. 2010).

Catt, "Consideration for ProSe one to one communication and service continuity aspects," S2-143882, SA WG2 Meeting #106, San Francisco, California, USA (Nov. 17-21, 2014).

Huawei et al., "Considerations on ProSe Direct Communication packet filter," S2-150280, SA WG2 Meeting #107, Sorrento, Italy (Jan. 26-30, 2015).

Third Generation Partnership Project, "Technical Specification Group Services and System Aspects; Proximity-based services (ProSe); Stage 2 (Release 13)," 3GPP TS 23.303 V13.1.1 (Sep. 2015).

Third Generation Partnership Project, "Technical Specification Group Services and System Aspects; Proximity-based services (ProSe); Stage 2 (Release 12)," 3GPP TS 23.303 V12.6.0 (Sep. 2015).

Third Generation Partnership Project, "Technical Specification Group Services and System Aspects; Proximity-based services (ProSe); Stage 2 (Release 12)," 3GPP TS 23.303 V12.2.0 (Sep. 2014).

Third Generation Partnership Project, "Technical Specification Group Services and System Aspects; Proximity-based services (ProSe); Stage 2 (Release 12)," 3GPP TS 23.303 V12.1.0 (Jun. 2014).

Qualcomm Incorporated, "One-to-one ProSe Direct Communication considerations," SA WG2 Meeting #104, S2-142442, Dublin, Ireland (Jul. 7-11, 2014).

* cited by examiner

OPTIMIZATIONS FOR PROSE COMMUNICATIONS

CROSS REFERENCE TO RELATED APPLICATIONS

This application is a continuation of U.S. patent application Ser. No. 15/516,194 which was filed Mar. 31, 2017, which is a continuation application of the U.S. National Stage, under 35 U.S.C. § 371, of International Application No. PCT/US2015/053833 filed Oct. 2, 2015, which claims the benefit of U.S. Provisional Application No. 62/059,608 filed on Oct. 3, 2014, the contents of which is hereby incorporated by reference herein.

BACKGROUND

For a typical evolved packet system (EPS) bearer, upon reception of an uplink data packet, traffic flow templates (TFTs) and packet filters in a wireless transmit/receive unit (WTRU) may evaluate the packet for a match. First, an uplink packet filter in the WTRU having a highest evaluation precedence index may evaluate the uplink data packet for a match. If no match is found, other uplink packet filters may evaluate the uplink data packet for a match in order of their evaluation precedence indices.

This procedure may continue until a match is found, in which case the data packet may be directed to an EPS bearer that is associated with the TFT of the matching uplink packet filter. If no match is found, the data packet may be sent via an EPS bearer that does not have any uplink packet filter assigned. If all EPS bearers (including the default evolved packet system (EPS) bearer for that packet data network (PDN)) have been assigned an uplink packet filter, the WTRU may discard that data packet. FIG. 2 illustrates an example of such a procedure. For proximity services (ProSe), a ProSe bearer may be configured.

SUMMARY

In an embodiment, a method and apparatus for communicating using proximity services (ProSe) is disclosed. The embodiment may include: setting up a ProSe bearer in a wireless transmit/receive unit (WTRU) using at least one aggregate maximum bit rate (AMBR) parameter, wherein the at least one AMBR parameter limits the upper bounds of a data rate of the ProSe bearer.

In an embodiment, a method and apparatus for establishing a direct connection between a first wireless transmit/receive unit (WTRU) and a second WTRU using proximity services (ProSe) is disclosed. The embodiment may include: receiving, from a PDN Gateway (PGW) in a wireless network, a final traffic flow template (TFT) for a ProSe bearer; receiving, from a policy and charging rules function (PCRF), quality of service (QoS) information for the ProSe bearer; and creating a ProSe bearer in the first WTRU.

In an embodiment, a method and apparatus for communicating between a first wireless transmit/receive unit (WTRU) and a second WTRU using proximity services (ProSe) is disclosed. The embodiment may include: upon the first WTRU discovering the second WTRU, verifying that conditions are met in order to establish a direct communication; and if the conditions are not met, reverting to discovery.

In an embodiment, a method and apparatus for enabling session continuity in proximity services (ProSe) communication when traffic is switched from an evolved packet system (EPS) bearer to a ProSe bearer is disclosed. The embodiment may include: sending a request from a ProSe capable wireless transmit/receive unit (WTRU) to a packet data network (PDN) gateway (PGW), wherein the request comprises network address translation (NAT) mapping information for default bearers and future dedicated bearers; and storing the NAT mapping information locally in the WTRU.

BRIEF DESCRIPTION OF THE DRAWINGS

A more detailed understanding may be had from the following description, given by way of example in conjunction with the accompanying drawings wherein.

DETAILED DESCRIPTION

Embodiments described herein may relate generally to wireless communications system, and more particularly, to proximity services (ProSe) used in device-to-device (D2D) communications among wireless transmit/receive units (WTRUs). As described below with reference to FIGS. 1A-6, embodiments may include optimizations to ProSe that address issues such as: the lack of network involvement for ProSe bearer setup and ProSe data bit rate control; the lack of network involvement or WTRU rules to set and select packet filter rules for filtering IP packets into ProSe bearers vs. evolved packet system (EPS) bearers; the lack of a defined dependency between discovery and communication for 1-to-1 communication; and the lack of defined methods for session continuity between internet and ProSe paths.

Figure 1A:
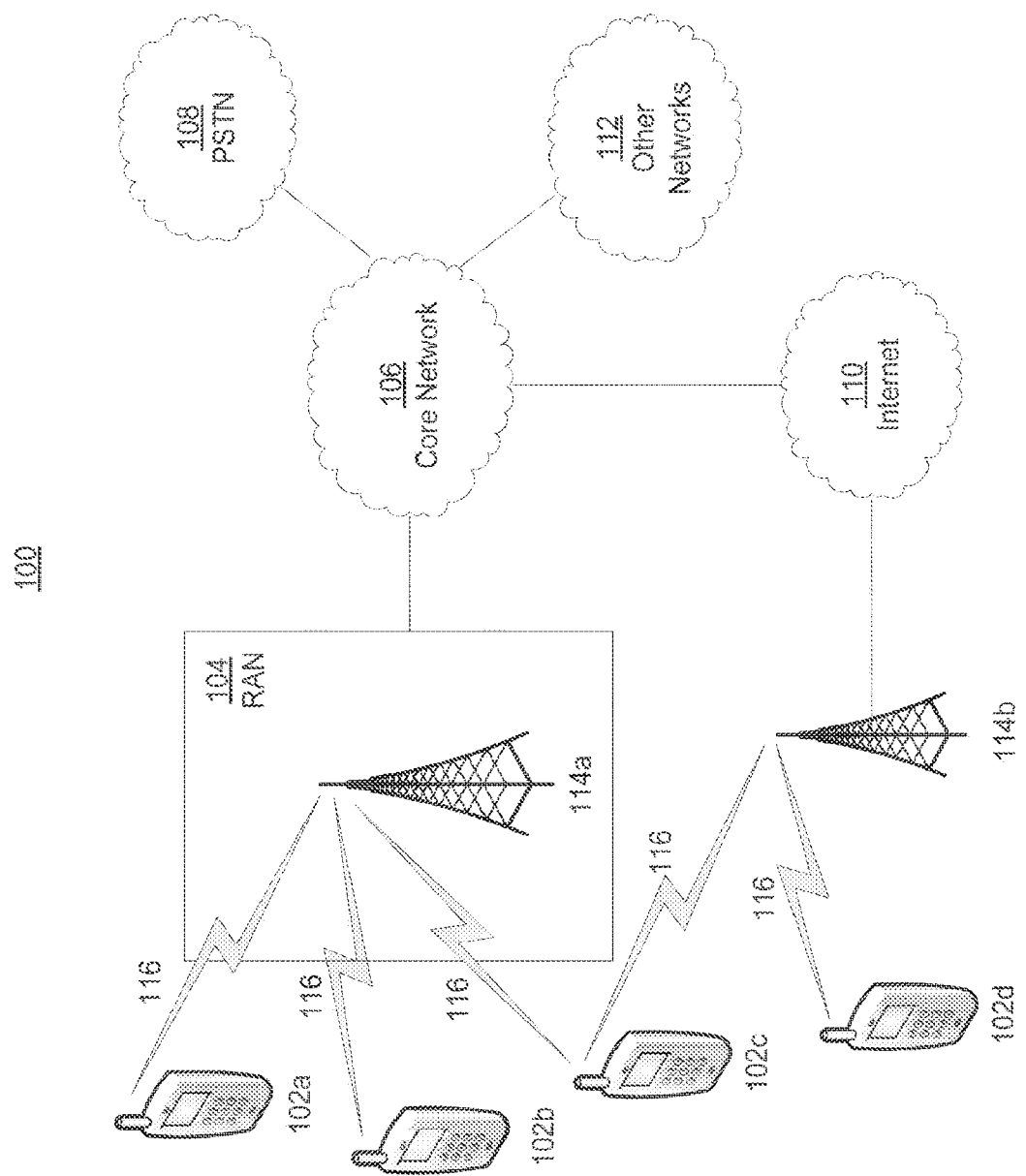
FIG. 1A is a system diagram of an example communications system in which one or more disclosed embodiments may be implemented.

Referring now to FIG. 1A, a diagram of an example communications system 100 in which one or more disclosed embodiments may be implemented is shown. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
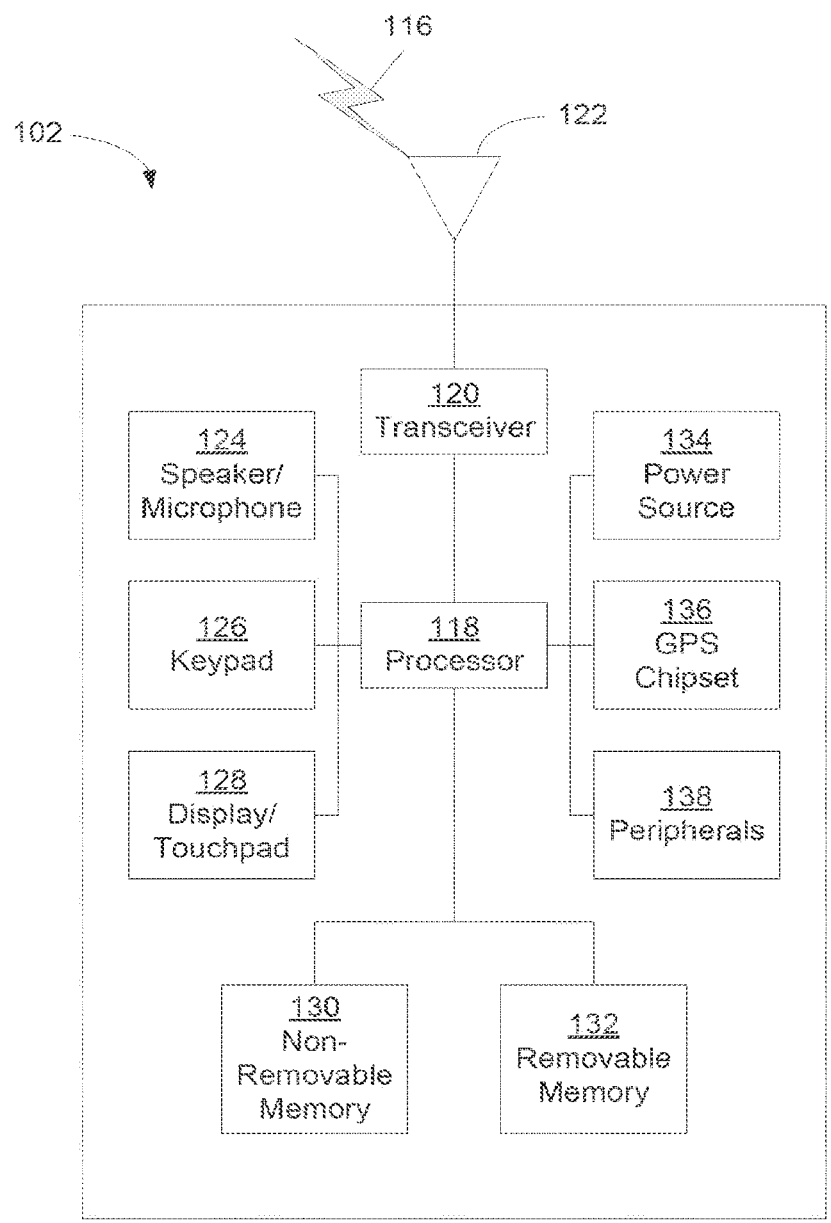
FIG. 1B is a system diagram of an example wireless transmit/receive unit (WTRU) that may be used within the communications system illustrated in FIG. 1A.

Referring now to FIG. 1B, a system diagram of an example WTRU 102 is shown. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
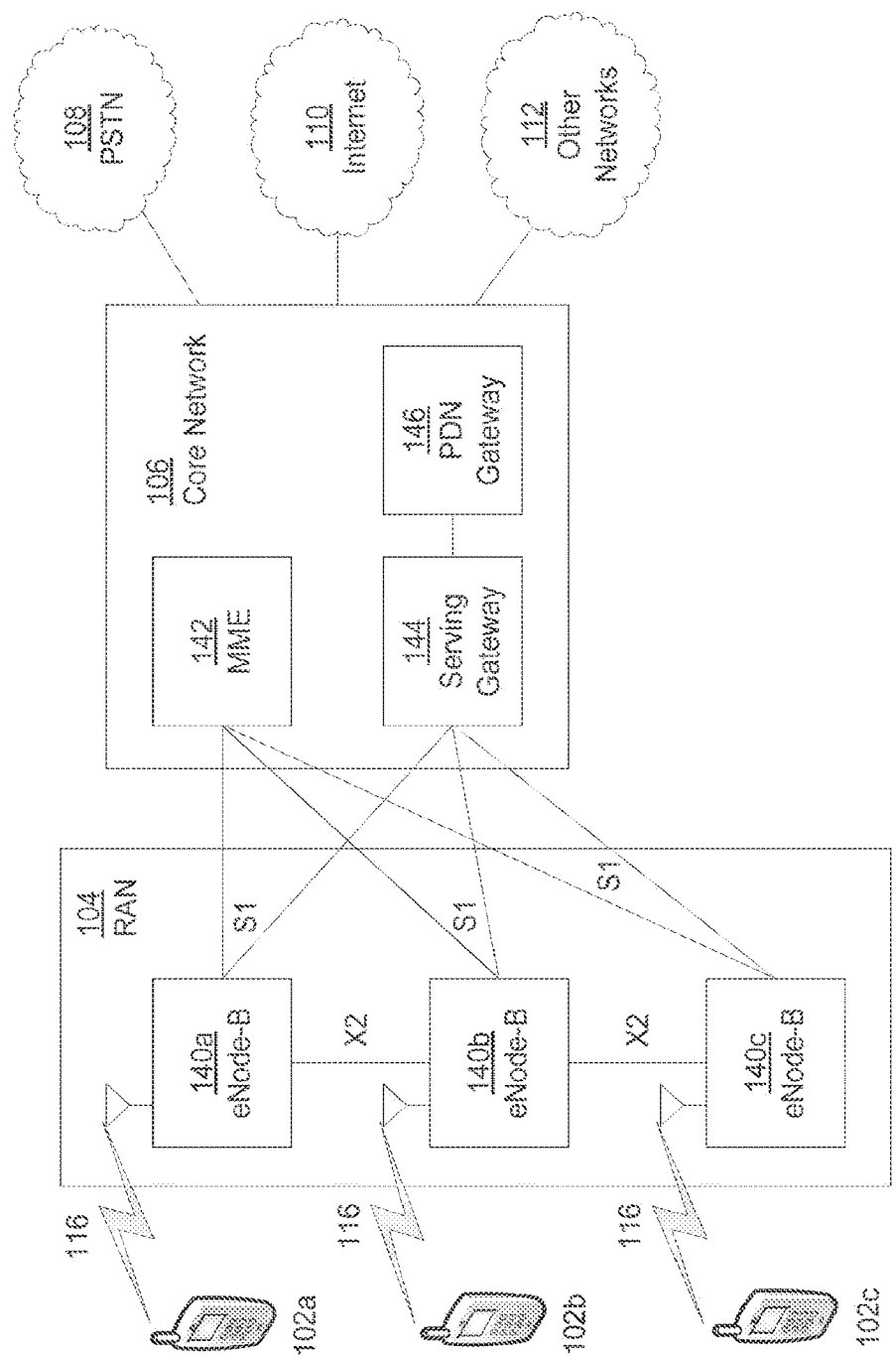
FIG. 1C is a system diagram of an example radio access network and an example core network that may be used within the communications system illustrated in FIG. 1A.
Figure 2:
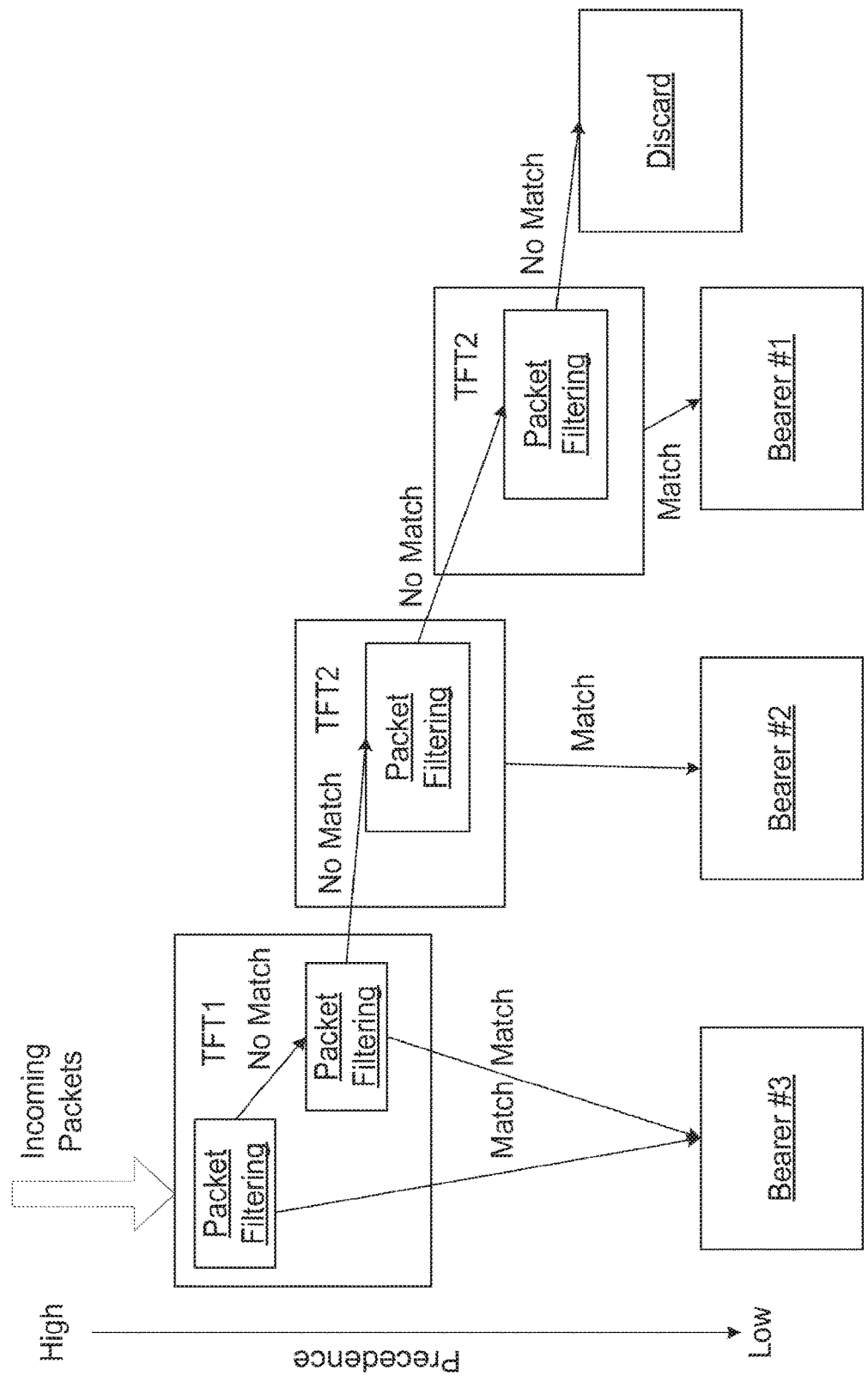
FIG. 2 is an example traffic flow template (TFT)/packet filter model in a wireless transmit/receive unit (WTRU)

Referring now to FIG. 1C, a system diagram of the RAN 104 and the core network 106 according to an embodiment is shown. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

As described above, there may issues with conventional ProSe communications that may be optimized. First, there may be no network involvement for ProSe bearer setup and ProSe data bit rate control. In some implementations, a ProSe bearer may be locally configured in a WTRU without any involvement by an eNB or MME. Furthermore, in some implementations there may be no control over the data rate that should be used by ProSe bearers (e.g. in order to ensure one WTRU does not overuse available resources, potentially starving other WTRUs from using resources for ProSe.)

Another issue may be no network involvement or WTRU rules to set and select packet filter rues for filtering IP packets into ProSe bearers vs. EPS bearers. As described above, packet filters in each TFT may each be assigned a unique precedence index within a WTRU (i.e., the priority of a data packet passing through that particular packet filter in a specific WTRU). This precedence index may be assigned by a PDN Gateway (PGW).

Following a model similar to the implementation of packet filters within the WTRU 102 for EPS bearers described above with reference to FIG. 2, a precedence index or priority may be assigned to the packet filters for ProSe bearers. The priority of ProSe bearer packet filters may be determined not only with respect to other ProSe bearers used by the WTRU 102, but also with respect to EPS bearers within that WTRU 102. Further, the behavior of a ProSe packet filter may be defined to differentiate ProSe packets from packets that traverse the evolved packet core (EPC). Moreover, it may be desired that ProSe packets receive the same or similar treatment when a ProSe connection is moved to an EPS connection (or vice-versa) for service continuity. The packet filter may therefore attempt to ensure that such packets receive the same treatment in either case.

Another issue may be the lack of a defined dependency between discovery and communication for 1-to-1 communication. In some implementations of ProSe there may be no relation between discovery and communication. Discovery may actually be unnecessary because such ProSe communications may be only implemented using a 1-to-many broadcast approach for a group. However, where 1-to-1 communications are desired, a relationship of communication to discovery may be enabled such that each WTRU 102 in the 1-to-1 communication may attempt to ensure that the other WTRU 102 is available before setting up a ProSe connection.

Another issue may be the lack of defined methods for session continuity between internet and ProSe paths. In some implementations of ProSe there may be no support for session continuity. However in some implementations of ProSe it may be desirable to require session continuity (i.e. for a data path established over the Internet and moved to a direct path, or vice versa.)

In a case where a session is switched from an EPC path to a ProSe path, the application may need to continue to use the original IP address which was obtained from the EPC during a PDN connectivity establishment procedure. An EPS bearer that carries the application traffic may be associated with IPv4 address only, an IPv6 address only, or a dual-stack (IPv4v6). If one of the two WTRUs 102 uses IPv4, (and the IPv4 address may not be public), a NAT44 or NAT64 function may be needed at the P-GW or other edge firewall or router of the EPC domain. With the NAT function in between, the source IP address and port of a packet that a WTRU 102 receives is thus different from what has been sent by the transmitter WTRU 102. When the application traffic is switched to the ProSe path, without NAT in place, the WTRU 102 may receive the packets with a different source/destination IP address and port. The packets may thus not be properly handled and delivered to the right socket within the WTRU 102.

In an embodiment, network authorization for ProSe bearer setup and bit rate control may be implemented. In some implementations of ProSe, network authorization may be required for the use of resources for ProSe by a WTRU 102. In other implementations, a ProSe bearer may be set up locally in the WTRU 102 without any authorization from the network. It is noted however that in some network configurations, the WTRU 102 may only get resources for ProSe if it requests them from the eNB, which may then provide the resource assignment via dedicated signaling.

The definition and use of a new ProSe aggregate bit rate is discussed herein. At least one new aggregate bit rate parameter per WTRU 102 may be implemented to limit (e.g. define an upper bound for) the data rate that may be transmitted on one or more ProSe bearers. This parameter maybe referred to, for example, as a WTRU ProSe aggregated maximum bit rate (AMBR), and may serve as an upper bound on the maximum bit rate that the WTRU 102 may use for data sent on ProSe bearers (i.e. a maximum bit rate for data that is sent directly between WTRUs using ProSe).

A ProSe bearer may be modeled in different ways, and, for example, may be considered a separate PDN connection. In another example, a set of ProSe bearers may be linked to one PDN connection, optionally with a specific access point name (APN). Depending upon how ProSe bearers are modeled, a parameter similar to the WTRU ProSe AMBR may be defined for every "PDN connection" to which a ProSe bearer is linked. For example, a ProSe APN AMBR may be defined as the maximum bit rate that a WTRU 102 can send over all ProSe bearers that are linked, or that are seen to be linked (e.g., locally in the WTRU 102) to a PDN connection that has a particular APN.

For example, a WTRU 102 may establish a PDN connection with a PGW. An APN associated with this connection may be called "APN X" regardless of whether the APN is a default APN chosen by the MME or a dedicated APN chosen by the WTRU 102. A ProSe APN AMBR may be associated with this APN, and may represent the maximum bit rate which can be sent on ProSe bearers that are associated or linked to the PDN connection associated with APN X.

It should be noted that the WTRU 102 may have more than one PDN connection. For example, the WTRU 102 may have a PDN connection with APN X and another with an APN Y. For each PDN (APN), the WTRU 102 may be provided with a ProSe APN AMBR. For a two PDN connection example, the WTRU 102 may have a "ProSe APN-X AMBR" and a "ProSe APN-Y AMBR" associated with the PDN connection with "APN X" and the PDN connection with "APN Y", respectively. The ProSe APN AMBR parameter or parameters may be linked to the WTRU ProSe AMBR parameter, where the WTRU ProSe AMBR may be the sum of all ProSe APN AMBRs that the WTRU 102 may have. Thus, the WTRU ProSe AMBR may act as an upper bound for the sum of all ProSe APN AMBRs that the WTRU 102 may have.

Optionally, a maximum bit rate may be defined per group or service that a WTRU 102 is part of, or subscribed to.

It should be noted that the proposed bit rate parameters may be defined for each direction (i.e., for the uplink (UL) and the downlink (DL)). Even though the examples or proposals provided herein may not be associated with a direction, the proposals may apply for the UL only, DL only, or both UL and DL directions.

The usage and enforcement of the WTRU ProSe aggregate bit rate is discussed herein. The WTRU 102 may be provided with a ProSe AMBR. The ProSe AMBR may be a WTRU ProSe AMBR, or a WTRU ProSe APN AMBR. The ProSe AMBR may be provided in any non-access stratum (NAS) mobility and/or session management message (e.g. Attach Accept, Activate Default EPS Bearer Request). For example, WTRU ProSe AMBR, and/or WTRU ProSe APN AMBR parameters may be defined in the home subscriber server (HSS) and provided to the MME when the WTRU 102 registers to the system. Alternatively, the MME may be locally configured with these parameters that may apply to one or more WTRUs 102. The MME may forward these parameters to the WTRU 102 via any NAS message.

The WTRU 102 may also obtain this information from the ProSe Function over a PC3 interface. In this case, the ProSe Function may send a message to the WTRU 102 indicating the maximum bit rate (e.g., per group or service) at any time when the WTRU 102 contacts the ProSe Function. The WTRU 102 may acknowledge the receipt of this parameter using signaling on the PC3 interface.

The WTRU 102 may enforce the maximum bit rate parameters received when it transmits over ProSe bearers or direct connections. The WTRU 102 may report to the network (e.g. to an MME, eNB, ProSe Function, other 3GPP nodes, or application server) when it sends data that exceeds this limit, as per the received parameters. Alternatively, when the WTRU 102 exceeds the limit, it may report to the user that data for the associated application cannot be sent due to data rate exceeding the limit per the received parameters. The WTRU 102 may also report the excess data used on ProSe bearers to any 3GPP node, if applicable. The WTRU 102 may also locally deactivate a ProSe bearer or inform the network that a ProSe bearer may have been deactivated or request deactivation from the network and indicate the reason as being excess data. The network (e.g. MME, eNB, ProSe Function, etc.) may then authorize (via NAS, RRC, or PC3 signaling) the use of more data or may not authorize additional data.

The proposed parameters may also be provided to the eNB via the MME when a WTRU's 102 context is being set up. This may be done using any S1AP message, such as a WTRU 102 or UE Context Set up Request. The eNB may also enforce these parameters when it provides resources to a WTRU 102 for direct communication. When these limits are exceeded or reached, the eNB may report to the MME or any other node in the system. The report may be propagated to the PGW by the MME via the SGW. A charging record may be issued for any excess data that is used on ProSe bearers. When ProSe data exceeds the limit defined by the proposed parameters, the eNB may inform the WTRU 102 via RRC signaling that no more data may be transmitted via the limited ProSe bearer or bearers as appropriate.

Network authorization for ProSe bearer establishment is discussed herein. In some implementations of ProSe, the WTRU 102 may locally configure a ProSe bearer without any authorization from the network (i.e., without any explicit request to the eNB/MME). It is noted however that there may be a check at the eNB of whether ProSe service is authorized for the WTRU 102. However, if this check passes, there may not be an explicit authorization request from the WTRU 102 to the network which solely serves the purpose of ProSe bearer establishment.

However it should be noted that where it is desired to limit ProSe bearers to a certain bit rate, and/or where it is desired that the eNB may control or monitor the use of resources for ProSe, it may be desirable to seek authorization from the network (e.g., at least from the eNB) when a ProSe bearer is to be established. Accordingly, the WTRU 102 may seek network authorization for the establishment of a ProSe bearer, optionally indicating the required QoS or priority or service associated with this ProSe bearer in such cases.

Figure 3:
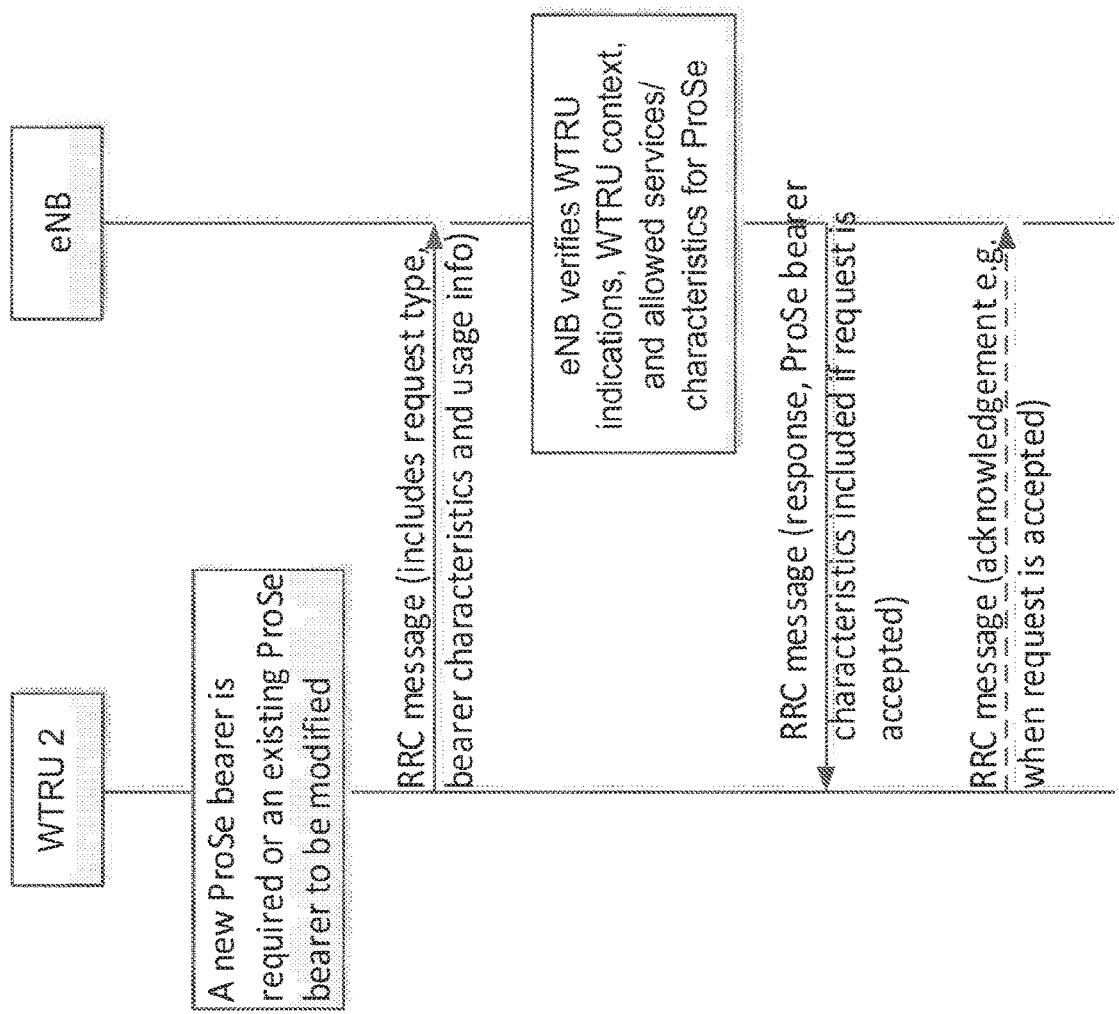
FIG. 3 is a diagram illustrating WTRU-eNode B signaling for proximity services (ProSe) bearer establishment.

Referring now to FIG. 3, a diagram illustrating WTRU-eNB signaling for ProSe bearer establishment is shown. A new or existing RRC message may be used by the WTRU 102 to request authorization for a ProSe bearer establishment. In the request, the WTRU 102 may indicate information about the use of the ProSe bearer such as, but not limited to: a requested QoS; an associated priority; whether the use is for one-to-many or one-to-one communication; a group ID for which this bearer will be used (if applicable); a service type (e.g. public safety vs non-public safety); a security parameter or parameters (if applicable); a ProSe bearer ID; or a target user ID, such as the identity of the peer WTRU 102, target ProSe WTRU ID, or any ProSe related ID that can be used to identify the target WTRU 102. Note that all, or a subset, of this information may be locally configured in the WTRU 102, or may be provided to the WTRU 102 via NAS signaling or via PC3 signaling with the ProSe Function.

Upon reception of a request to establish a ProSe bearer, the eNB may verify the WTRU's 102 context to check what is allowed for the WTRU 102 in terms of ProSe service. For example, the eNB may verify the existing number of ProSe bearers, the ProSe bit rate generated by the WTRU 102, and the services allowed for this WTRU 102 (e.g., an allowed group with which the WTRU 102 can have a communication). The eNB may obtain this information from the MME as part of the WTRU 102 context set up. Alternatively, the eNB may be configured with this information on either a per WTRU 102 basis or on a per destination group ID basis. In addition, the same local policies may be applied to all WTRUs 102 in the system for which ProSe is allowed. Based on this check and other local policies in the eNB, the eNB may respond with a new or existing message to indicate the result.

For example, if the request is accepted, the eNB may send an RRCConnectionReconfiguration Request, or any other existing or new RRC message, to the WTRU 102 indicating that a ProSe bearer should be established. The eNB may indicate the configurations for this bearer (e.g., the mode to be used for PDCP, RLC, the priority, bit rate, or any subset of the parameters listed above). The eNB may also indicate an identity for this ProSe bearer.

If the request is rejected, the eNB may send a rejection message using, for example, any new or existing RRC message, indicating the reason for rejection (e.g. maximum number of active ProSe bearer reached). The response from the eNB may include any of the parameters received initially from the requesting WTRU 102 (e.g., target WTRU ID and/or group ID).

It should be noted that the messages proposed above may also be used to modify a ProSe bearer. The modification may include an activation of a new ProSe bearer, a modification of an existing ProSe bearer, or a deactivation of an existing ProSe bearer. If the request is to modify or deactivate a ProSe bearer, the WTRU 102 may include a ProSe bearer ID. It is noted that one RRC message may contain multiple modification requests for multiple ProSe bearers each of which may have a corresponding ProSe bearer ID. For example, a WTRU 102 may send one RRC message in which it requests both a new ProSe bearer establishment and a modification of an existing ProSe Bearer. Similarly, the eNB may respond with an RRC message containing a modification result for multiple bearers that are identified by a ProSe bearer ID.

The eNB may, at any time, send an RRC message to the WTRU 102 to request modification (activation, deactivation, or modification) of at least one ProSe bearer which may also include the related parameters for each ProSe bearer. The eNB may include the target WTRU ID/group ID for which this modification is related.

It should be noted that the messages proposed above may also be used for any communication path that is optimized even if it is not the direct path. For example, the same concept may apply if the data path were to be "short cut" at the eNB or at any node in the system.

In another embodiment, TFTs and associated priorities may be set up. A TFT for ProSe may be obtained from the PGW. In this case, the PGW and policy and charging rules function (PCRF) may be involved when it is desired for a first WTRU 102 to set up a ProSe direct connection with a second WTRU 102. In order to create a ProSe bearer, the first WTRU 102 may be required to send the request to the PGW in order to obtain a final TFT for this bearer and also to communicate with the PCRF in order to obtain an appropriate QoS.

It may be assumed that both WTRUs 102 in proximity have discovered each other, and as part of the discovery mechanism, have exchanged their IP addresses and/or ProSe WTRU IDs. The WTRUs 102 may have also negotiated the preferred QoS for this session.

In order to set up a ProSe bearer in this case, the first WTRU 102 (i.e., source WTRU 102) may send a ProSe bearer request within a NAS message towards the MME. The request information may include details about uplink/downlink IP address and ports and the QoS requested for this ProSe bearer. This IP information may be related to the second WTRU 102 (i.e., destination WTRU 102) as well. For example, it may match the IP information (e.g., IP address, port, etc.) that was exchanged between the WTRUs 102.

The source WTRU 102 may also include a session/link identifier to allow the MME to identify with which WTRU 102 the ProSe bearer will be set up. One possible approach for including a link identifier is for the source WTRU 102 to include both its ProSe WTRU ID and the ProSe WTRU ID of the target WTRU 102 with which to set up a connection.

The destination WTRU 102 may also send a separate NAS request to establish a ProSe bearer. The destination WTRU 102 may include identical or similar information to that provided in the source WTRU request, such as uplink IP flows, requested QoS, and a link identifier which can be the WTRUs ProSe WTRU IDs. In the following procedure, it may be assumed that the WTRUs 102 are part of a different public land mobile network (PLMN) and hence the WTRUs 102 may communicate to different MMEs, PGWs, and PCRFs. However, the same concepts may also apply when the WTRUs 102 belong to the same MME, in which case the same MME serves the two WTRUs 102. Similarly, the same eNB may serve both WTRUs 102.

It should be noted that both WTRUs 102 may contact the ProSe Function to obtain a session ID that is unique for this pair of WTRUs 102. Each WTRU 102 then may provide the session ID to the MME which may forward the information to the PGW. Each core network (CN) node may use this session ID/link ID to map bearer requests from the two WTRUs 102.

Both MMEs (assuming the WTRUs 102 are part of different PLMN) may send requests (e.g. within a NAS message) to the PDN-GW (PGW) to set up ProSe bearers for both WTRUs 102. Both MMEs may include the link identifier for this ProSe session in their request.

The PGW, upon reception of this request, may send a policy and charging (PCC) rule request to the PCRF. The PCC rule request may include the link identifier and user information. In an inter-PLMN situation, the PCRF may negotiate QoS rules for this ProSe session via a roaming interface and may send a PCC rule to the PGWs.

Based on the policies provided by the PCRF, the PGWs may construct the ProSe TFTs, which may include setting up UL and DL TFTs and defining an evaluation precedence index, and QoS of the ProSe bearer. The PGWs may then provide this information to the MME. The MME may then send this information to the WTRUs 102 via a NAS response message.

The MME may create a ProSe bearer identity for each ProSe bearer and may forward the request to the eNBs. The message may also contain a counterpart NAS message that may also be sent to the WTRU 102 to provide it with the allocated TFTs for the ProSe bearer.

The eNBs may establish a ProSe bearer towards each WTRU 102 as per the received QoS information from the MME.

Upon reception of such an NAS response from the MME, each WTRU 102 may install the ProSe TFT and packet filters as indicated in the NAS message. At this point, the WTRUs 102 may consider the ProSe bearer to be successfully established.

Methods of determining a Precedence Index for TFTs/packet filters associated with ProSe bearers is discussed herein. In a circumstance where a WTRU 102 uses ProSe bearers, it may use two sets of packet filters: EPS bearer Packet Filters and ProSe packet filters. The packet filters associated with EPS bearers linked to the ProSe bearer may be configured by the network. For example, the characteristics or configuration of these packet filters may be provided by the P-GW during the establishment of these EPS bearers or when the ProSe bearer is configured.

The packet filters associated with the ProSe bearers may be locally configured within the WTRU 102 based on packet filter parameters, such as a Precedence Index received by the WTRU 102 for the corresponding EPS bearer. A locally configured packet filter may have a different IP 5-tuple then the EPS bearer packet. This may be because the source/destination IP address associated with a ProSe packet may be different from a ProSe packet going over the internet or EPS Bearer. The Precedence Index of the locally configured Packet Filter may be the same as the Precedence Index of the corresponding EPS packet filter. This may result in the ProSe packet receiving the same priority treatment in a service continuity scenario (i.e., when the connection moves from ProSe to EPC or vice-versa).

Figure 4:
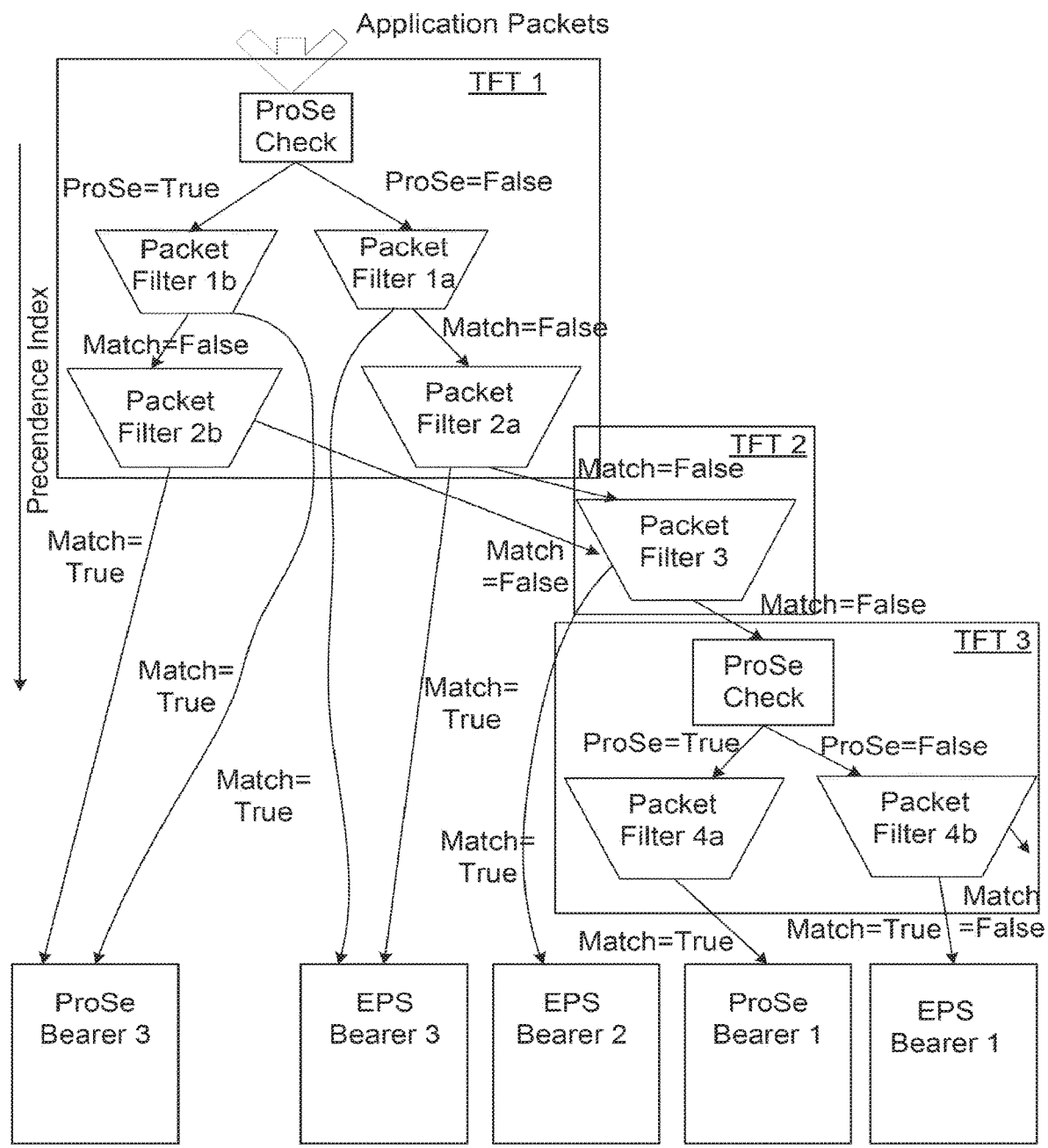
FIG. 4 is a TFT/packet filter model for a WTRU with ProSe bearers.

Referring now to FIG. 4, a TFT/packet filter model for a WTRU 102 with ProSe bearers is shown. FIG. 4 illustrates an example method for using packet filters within various uplink (UL) TFTs in a ProSe WTRU 102 (i.e., a WTRU 102 which includes ProSe bearers and EPS bearers). The example packet filter/TFT model shown in FIG. 4 illustrates a method wherein for every ProSe bearer (per Layer 2 source/destination), there may be a corresponding EPS bearer in the WTRU 102 which may be used for service continuity purposes (i.e., ProSe to EPS or vice-versa). This EPS bearer, or its context, may be established at the time of establishment of the ProSe bearer but it may not be used. This EPS bearer may be used for service continuity purposes if the ProSe traffic moves to the EPS bearer or vice-versa. In the scenario described in FIG. 4, EPS Bearer #3 and EPS Bearer #1 may be EPS bearers corresponding to ProSe Bearer #3 and ProSe Bearer #1, respectively.

The packet filter associated with the EPS bearers linked to the ProSe Bearer (i.e., Packet Filter 1*a*, Packet Filter 1*b* and Packet Filter 4*b*) may be configured by the network. For example, the characteristics or configuration of these packet filters may be received from the P-GW during the establishment of these EPS bearers, or may be received when the ProSe bearer is configured. In the latter case, it may be necessary for the WTRU 102 to indicate to the network that the ProSe bearer is being established. This indication may be in the form of a Bearer Resource Command (NAS message) to the MME or a similar NAS message. The MME may then request the P-GW (via S-GW) to send the parameters of the EPS bearer packet filters. These UL packet filter parameters may then be passed on to the WTRU 102 via a NAS response message.

The packet filters associated with the ProSe Bearers, ProSe Bearer #3 and ProSe Bearer #1, may be locally configured within the WTRU 102 based on the packet filter parameters. This may be done using the Precedence Index received by the WTRU 102 for the corresponding EPS bearer, EPS Bearer #3 and EPS Bearer #1. As described above, the precedence index of the locally configured Packet Filter may be the same as the Precedence Index of the corresponding EPS packet filter (e.g., the Precedence Index of locally configured Packet Filter #4*b* may be the same as the EPS Bearer packet filter #4*a*).

As described above, the packet may be evaluated by the packet filters starting from the highest precedence index to the lowest precedence index. However, in case of a ProSe bearer there may be two packet filters within a TFT which have the same precedence index. This issue may resolved by performing an additional check in the TFT associated with the ProSe bearer (e.g. ProSe Check in FIG. 4 for TFT 1 and TFT 3). The ProSe check may match whether a packet belongs to the ProSe bearer or the regular EPS bearer. If the packet is a ProSe packet, it may be sent to the locally configured ProSe bearer. On the other hand, if the ProSe Check determines that the packet is an internet or EPS packet, then it will be sent to the corresponding EPS Packet filter at the same precedence level. Further details of the ProSe check functionality is described further herein.

For the scenario depicted in FIG. 4, if the packet passes through the ProSe check in TFT 1, it may be evaluated by the Packet Filter with the highest precedence index, and it may flow through the packet filters from highest precedence towards the packet filter with lowest precedence index until a match is found. It should be noted that for every TFT with the ProSe check, the packet first must pass through the ProSe Check before it is evaluated by the packet filters in that particular TFT.

Figure 5:
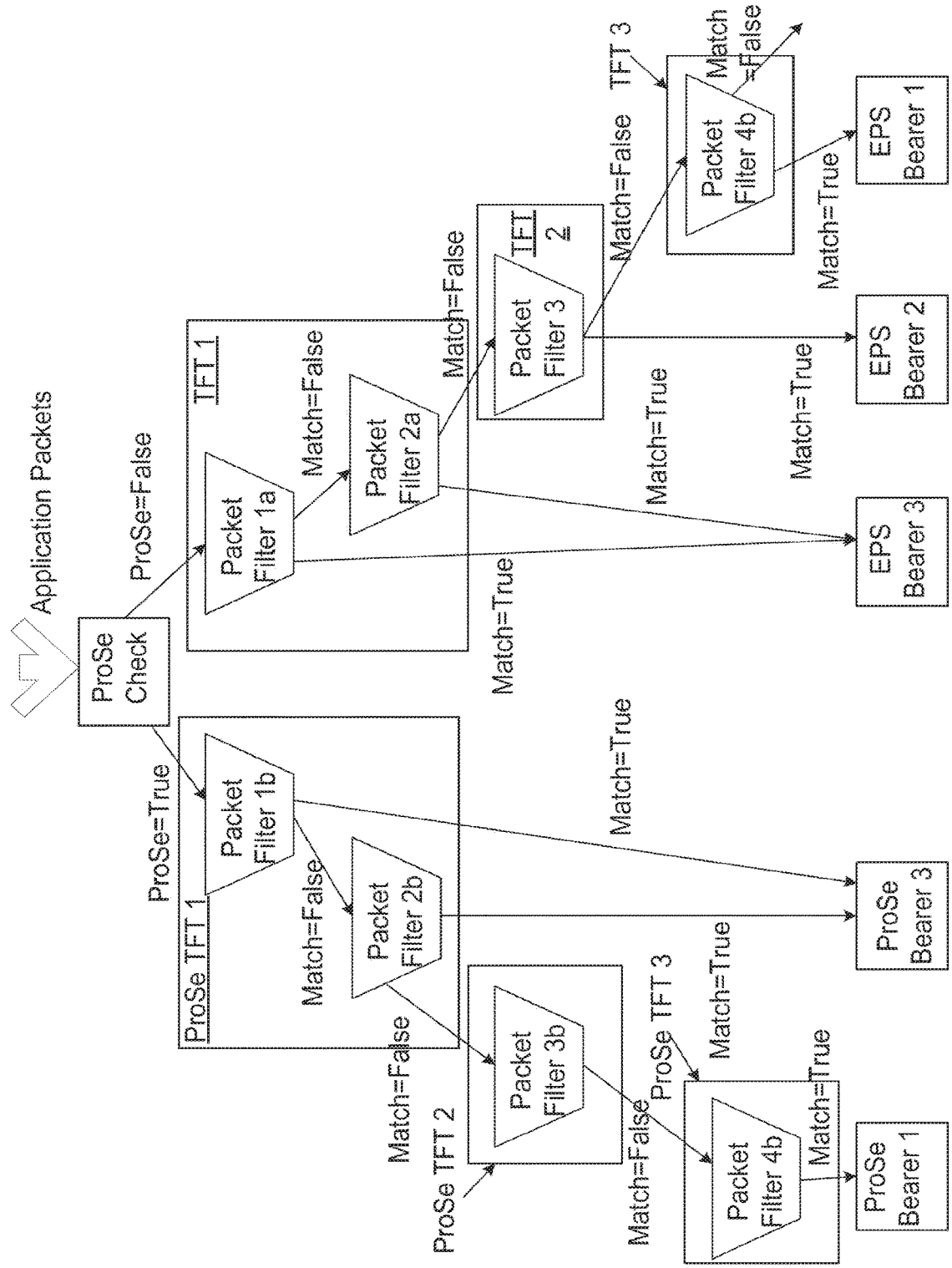
FIG. 5 is a proposed model where a ProSe check is performed before the TFTs.

Referring now to FIG. 5, and in alterative example, a diagram of a proposed model where a ProSe check is performed before the TFTs is shown. The ProSe Check may be performed once before the packet flows through different packet filters. Based on this check, the packets may either flow through either EPS TFTs and packet filters, or ProSe TFTs and packet filter. It can observed from FIG. 5 that if the ProSe Check is false, then the packets may only flow through TFT1, TFT2 and TFT3, whereas if the ProSe check is true, then the packets may pass through ProSe TFT1, Prose TFT2 and/or ProSe TFT3.

It should be noted that in the example of FIG. 5, there may optionally be a ProSe TFT/packet filter without any ProSe bearer. This may be to help ensure that the precedence of a ProSe bearer and a corresponding EPS bearer remains the same. It can be seen in the FIG. 5 that a ProSe packet for ProSe Bearer #1 would go through the same filter checks as the EPS packet for EPS Bearer #1, for example.

ProSe check functionality is described herein. The ProSe check may be based on one or more of the following parameters.

If the ProSe Bearer corresponding to the EPS Bearer exists or is configured, the ProSe check may always direct the packet towards the ProSe packet filter side. For example, in the case of TFT1 in FIG. 5, when the ProSe bearer is configured, the packet may always go towards Packet Filter #3*b*. This may assume that when there is a need for service continuity (i.e., moving from ProSe to EPS) the ProSe bearer context may be deleted in the WTRU 102. The corresponding local packet filters may no longer exist.

If the source or destination IP address for the ProSe connection is different from the corresponding IP address for the EPS connection, the ProSe check may only assess the IP address of the packet. Based on the IP address, it may decide to the send the packet either to the ProSe packet filter or to the EPS Bearer Packet filter. This check may be possible because in some scenarios, the ProSe IP address may be locally configured/assigned whereas the source IP address for the EPS Bearer may be assigned by the P-GW.

If the ProSe application is aware of a service continuity switch between from ProSe to EPC and vice-versa, the application may indicate that a certain packet is a ProSe packet. The ProSe check may then direct the packet towards the ProSe packet filter based upon this indication.

Alternatively, the value of a ProSe check flag may be determined based on one or more configured rules or conditions provided to the WTRU 102. The rules may be static (e.g., may indicate that traffic of certain applications may always be sent over a certain link) or dynamic (e.g., may indicate that in case session continuity is triggered due to a change in link conditions on one link, all traffic may be re-routed to another link). When one or more of these rules or conditions are met, the WTRU 102 may reconfigure the ProSe check condition appropriately to route traffic to either the ProSe link or the EPC link.

The rules may be configured in the WTRU 102 using one or more of the following options. The rules may be configured in the WTRU 102 using an access network discovery and selection function (ANDSF), and may include routing rules to determine which application traffic type should be sent using a particular link. The ANDSF may also be used to configure triggers and configuration parameters associated with the triggers to determine when traffic should be switched from one link to another link.

The rules may be preconfigured in the WTRU 102 or the connection manager. For example, the connection manager may be configured to allow use of a device-to-device (D2D) link only for certain application traffic classes.

The rules may be configured with bearer configuration. Triggers which must be met to switch traffic from one link to another link may be configured in the WTRU 102 along with the bearer configuration. For example, during the configuration of the ProSe bearer, the WTRU 102 may be configured with conditions under which the traffic may be switched from ProSe link to EPC link.

The rules may be installed by the ProSe function. The rules, including those dictating which traffic/application can be sent over which link as described above, may be installed in the WTRU 102 during registration and/or configuration by the ProSe function.

Another embodiment may involve communication following discovery. In order to help ensure that ProSe communication will succeed (e.g., determine that the WTRUs 102 are still in close proximity such that a direct communication session may take place), a communication session may be linked with a discovery event. In other words, a successful discovery may lead to communication if certain conditions are met. The WTRUs 102 may verify whether the conditions are met in order to start a direct communication session which may involve signaling with the network or a peer WTRU 102. If these conditions are not met, the WTRUs 102 may trigger discovery again in order to establish communication.

There may be at least one condition to be checked by each WTRU 102, such as the location and/or proximity of both WTRUs 102, or a time window during which communication can take place after a discovery procedure. If the WTRUs 102 determine that the location or distance condition is not met, or if the time window expires before communication is established, the WTRUs 102 may abort the pending communication session and may reattempt discovery.

Figure 6:
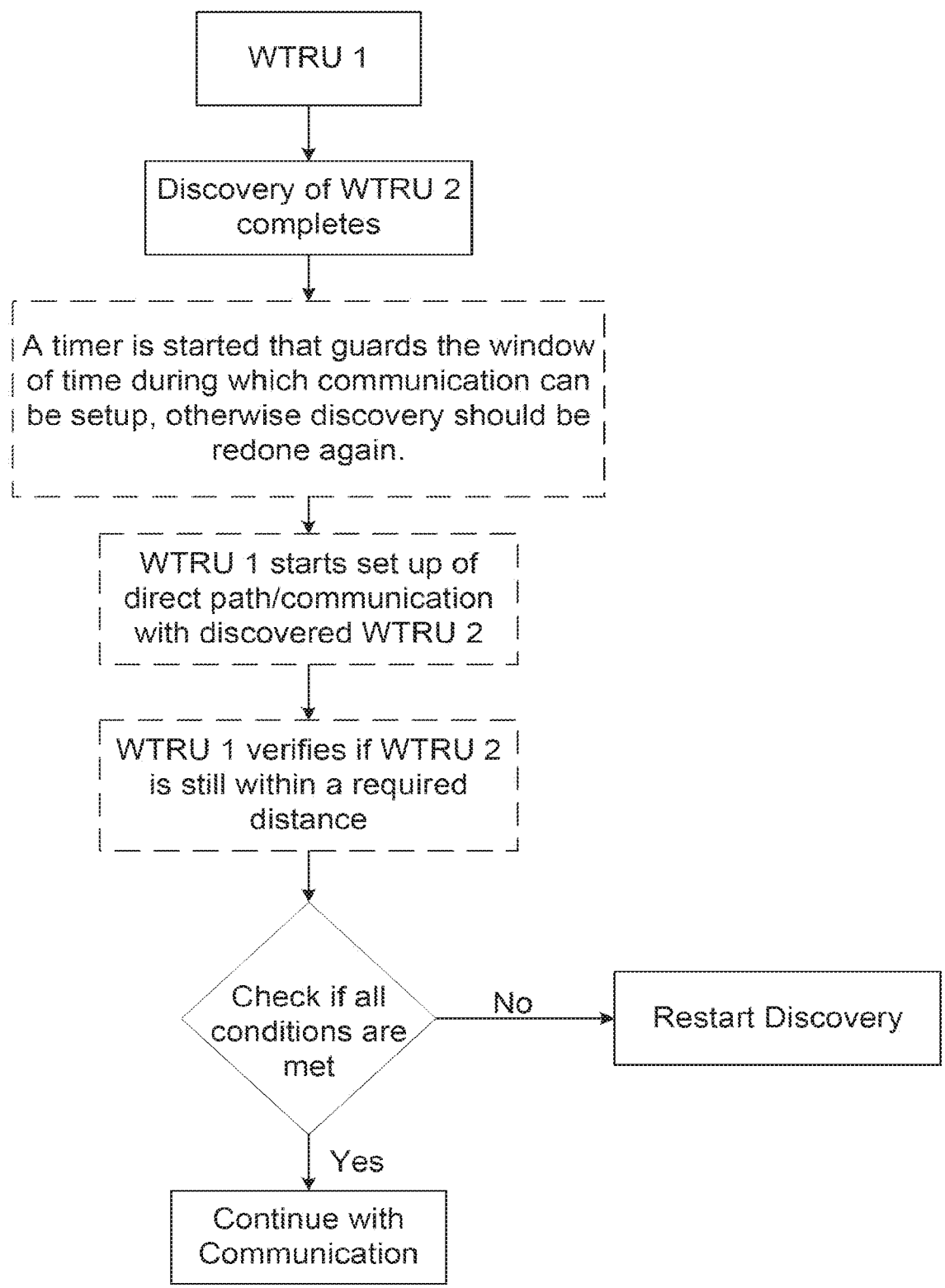
FIG. 6 is a diagram of linkage between discovery and communication.

Referring now to FIG. 6, a diagram of linkage between discovery and communication is shown. FIG. 6 illustrates an example of an overall procedure for each WTRU 102 (e.g., a WTRU 102 that initiated the discovery, or a WTRU 102 that is initiating the communication) in order to successfully establish a communication session.

Verification of location and/or distance criteria before initiation of a communication session (or after it is initiated) is discussed herein.

Location information, such as a required distance between the WTRUs 102 for direct communication, may be verified before a direct path is established, or during the establishment of the direct path. For example, a WTRU 102 may begin signaling with a peer WTRU 102 and/or the network in order to establish a direct path, but until the procedure is completed, the WTRU 102 may continue to verify its location relative to the location of the peer WTRU 102 which may have been previously discovered.

A procedure or procedures of the ProSe Function may be triggered by a match report. The match report may be generated by the ProSe Function when two WTRUs 102 have discovered each other or when a session start is initiated for communication over PC5. Thus, when a WTRU 102 initiates a communication session (or after a communication session starts), each WTRU 102 involved in the communication may send an indication to the ProSe Function to inform it of the start of the communication or to request periodic location updates or tracking of the distance between the WTRUs 102 that are involved in communication. This may help determine whether the session should be switched to the Internet, or should be stopped over the direct link, if the WTRUs 102 are not within the minimum required proximity distance for a direct communication to occur. The WTRU 102 may include identities of other WTRUs 102 with which it is having a communication session in such indication.

The ProSe Function may then begin retrieving location information for the identified WTRUs 102 by initiating a request for location reporting at both secure user plane location (SUPL) platforms (SLPs) of the WTRUs 102 involved in communication, using, for example, the PC4b interface. This may be done because the WTRU locations used for discovery may have been retrieved from an SLP server and may be outdated, not accurate enough, or the proximity may have only been temporarily valid. The SLPs may then request a measurement of their respective WTRU's 102 latest detailed locations.

The ProSe Function may trigger periodic location requests, a single, or a short period of multiple detailed location requests from the SLP for both WTRUs 102 in order to determine whether the WTRUs 102 are moving out of range. If the WTRUs 102 are found to be moving out of range, then procedures to establish communication can be avoided. Alternatively, the ProSe Function may send a recommendation to the WTRUs 102 to maintain, abort, or switch the communication based on the location information or distance of both WTRUs 102 from each other.

If the WTRUs 102 belong to different ProSe Functions, the ProSe Function of one WTRU 102, such as the WTRU 102 that initiates communication, may contact the ProSe Function of the other WTRU 102, which in turn, may contact the SLP to obtain location information of its WTRU 102. The location information response may be propagated back to the first ProSe Function as may be done presently for EPC discovery.

As another option, before initiating communication, a timer may also be used following discovery. After the timer, the ProSe function may trigger a location report from both WTRUs 102. If the location is still found to be within range, the timer may be reset and started again. The timer may be used as a new basis for location reporting intervals. The new location reporting periodicity may be synchronized with the timer to allow the latest WTRU location to be available at the SLP server. As long as both WTRUs 102 are within range, they may be assumed to be capable of establishing communication.

After communication has been established, WTRU locations may be used to maintain session continuity by enabling the ProSe function to measure whether WTRUs 102 are moving apart while they are communicating with each other. The ProSe function may initiate an additional discovery request or requests during which two WTRUs 102 may exchange measurements of the quality of their direct communication link (e.g., over PC5). The ProSe function may then revert back to an EPS bearer if it measures that the direct link has degraded beyond a certain level, based on, for example, the distance between the two WTRUs 102 or on other measurement reports.

The use of a time window to guard communication setup after a discovery event is discussed further herein. In an example, a timer may be started at each WTRU 102. In another example, the timer may be started at the WTRU 102 that discovered a peer with whom it wants to establish a direct communication path/The length of the timer may define an interval during which a communication session, or a direct path, should be set up before another discovery is necessary. If such a timer is used, the WTRU 102 may establish a ProSe communication path with its peer WTRU 102 as long as the time has not yet expired. However, upon expiry of the timer, if the communication path is not yet established, the WTRU 102 may abort the procedure and may restart the discovery procedure.

The length of the timer may be locally configured in the WTRU 102, for example, per application, per destination address, or per group of which the WTRU 102 is a member. Alternatively, the ProSe Function may provide each WTRU 102 with the timer value. For example, the timer could be provided by the ProSe Function and included in a Match Report Acknowledgement sent to the WTRU 102. In the case of EPC-level ProSe discovery, the timer may also be administered by the ProSe Function and incorporated in Proximity Alert messages sent to WTRUs 102 after proximity has been detected.

The determination of which conditions should be checked is discussed further herein. The location (or distance) and time window conditions discussed herein are examples of conditions that a WTRU 102 may verify to help ensure that a communication session may be successfully established. However, these examples are not exclusive and are not meant to restrict the conditions that may need verification. A WTRU 102 may be preconfigured with conditions that may be necessary to verify based on the service (e.g., public safety vs non-public safety), the group ID for which the communication is needed, the target WTRU 102, or other user settings.

Alternatively, the network (e.g., a MME, an eNB, or a ProSe Function) may indicate to the WTRU 102 which conditions to verify and what values to use, such as, for example, a value for a timer condition as described above. Such conditions may be provided on a case by case basis. For example, the conditions may change per communication session, or may be the same for all communication sessions. The network may modify these conditions based on local policies or based on failure/success reports which may be sent to the network by the WTRU 102. The WTRU 102 may send the rate of success/failure of establishing a communication path (optionally after a discovery event) with a peer WTRU 102. The WTRU 102 may be configured to do so by the network or based on local configurations or user settings.

Another embodiment may involve the enablement of session continuity. Methods discussed hereinafter may address the IP address issues described above in order to enable session continuity when application traffic is switched from an EPS bearer to a ProSe bearer. For the following examples, it may be assumed that a network address translation (NAT) function, such as NAT44 or NAT64, resides within the P-GW.

For example, a ProSe capable WTRU 102 may request the P-GW to provide NAT mapping information for all default bearers and future dedicated bearers in a PDN Connectivity Request message. The request may be indicated using the protocol configuration options (PCO) information element. Later if the P-GW adds a NAT mapping for certain application traffic, it may proactively send the new NAT mapping info to the WTRU 102 in an appropriate EPS session management (ESM) message, such as an EPS Bearer Activation or EPS Bearer Modification, possibly also using a PCO information element.

Alternatively, a ProSe capable WTRU 102 may send such a request using another appropriate ESM message that can carry a PCO information element, such as an ESM Info Request.

In another example, a ProSe capable WTRU 102 may request NAT mapping info only after a switch from EPC to ProSe is triggered. In addition, the WTRU 102 may explicitly indicate for which application it is requesting NAT mapping information. Upon receiving this request, the P-GW may return the specific NAT mapping info for this application.

After receiving the NAT mapping info from P-GW, the WTRU 102 may locally store the information and may update the information upon new information from the P-GW. NAT mapping info acquired from P-GW may be used for local NAT functions performed by the WTRU 102 for ProSe traffic.

Triggers for session continuity are discussed herein. A WTRU 102 may be configured with one or more events to trigger a transition of traffic from an EPC link to a D2D link or vice-versa. The example triggers discussed below may be described in relation to two or more WTRUs 102 (e.g., WTRU A and WTRU B), that may be engaged in an IP communication session. Without any loss with generality, this example can be extended to WTRUs 102 engaged in multiple IP communication sessions to different destinations, each of which may be unicast, groupcast or broadcast.

A WTRU 102 may be configured to perform session continuity when one or more of the events below are triggered.

Application-based triggers may be utilized. An application may be associated with a preferred link, and the start or stop of an application may be an event triggering session continuity determination. For example, two WTRUs 102 may be using a direct D2D link with each other for applications/traffic, and when a new application/traffic is started the WTRU 102 may determine whether it is necessary to switch part or all traffic to the EPC link.

Mobility-based triggers may be utilized. A WTRU 102 may determine that it is necessary to perform session continuity when it detects a change in its channel conditions with respect to the network. For example, a WTRU 102 may determine that it is necessary to switch traffic from an EPC link to a D2D link when its connection with EPC network is lost or starts to degrade. In some situations, upon detecting such a condition, the WTRU 102 may initiate a discovery operation to look for a relay WTRU 102 and if a relay WTRU 102 is detected, may perform session continuity to continue application traffic through the relay link.

In the event one or more of the above triggers are met, the WTRU 102 may initiate operations to enable session continuity.

In one example, the WTRU 102 may reconfigure the application and TFT filters to switch some or all application/traffic from one link to another. As discussed above, the WTRU 102 may be configured to perform a "ProSe check" for each incoming packet, to determine if the packet should be sent over a D2D link or an EPC link. In one example, if WTRU A is engaged in an IP session with WTRU B over an EPC link detects that WTRU B is within a specified proximity and capable of performing D2D, WTRU A may reconfigure its rules to send all applications destined to WTRU B using a ProSe link. This may be done by appropriately configuring the ProSe check rule.

In order to perform session continuity, it may be necessary for the WTRU 102 to determine an identifier to send/receive messages from the destination WTRU 102 using the other link. A WTRU 102 may initiate operations to determine the configuration parameters to switch traffic. In one example, a WTRU 102 may perform a query using an identifier on one link to determine an identifier used in another link. For example, if a WTRU 102 engaged communicating with another WTRU 102 over a D2D link determines that the D2D link is no longer available, it may send a query to a network entity (e.g., PGW or ProSe function) to request a new identifier, such as an IP address. In one example, the WTRU 102 may send a ProSe WTRU ID and an IP address of the destination WTRU 102 on the D2D link, and request an IP address of the destination WTRU 102 to send traffic over the EPC network.

It may also be necessary for a WTRU 102 to initiate or modify bearer configuration. In order to switch traffic from one link to another link, it may be necessary for a WTRU 102 to request new bearers or modify a bearer configuration. For example, it may be necessary for a WTRU 102 to create new ProSe bearers to support traffic being switched from an EPC link to a D2D link.

It may also be necessary for a WTRU 102 to initiate or terminate a PDN connection with the network. For example, in order to initiate a new ProSe link, it may be necessary for a WTRU 102 to create a new PDN connection for ProSe with the network.

The rules and events described above for session continuity may be configured in multiple ways. For example, the rules may be configured in the WTRU 102 using ANDSF, and may include routing rules to determine which application traffic type should be sent using a particular link. The ANDSF may also be used to configure triggers and configuration parameters associated with the triggers to determine when traffic should be switched from one link to another link.

In another example, the rules may be preconfigured in the WTRU 102 or the connection manager. For example, the connection manager may be configured to allow use of D2D link only for certain application traffic classes.

In another example, the rules may be configured with bearer configuration. The triggers that are necessary to be met in order to switch traffic from one link to another link may be configured in the WTRU 102 along with a bearer configuration. For example, during the configuration of the ProSe bearer, the WTRU 102 may be configured with conditions under which the traffic may be switched from a ProSe link to an EPC link.

In another example, the rules may be installed by the ProSe function. The rules, including which traffic/application can be sent over which link as described above, may be installed in the WTRU 102 during registration and/or configuration by the ProSe function.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of communicating using proximity services (ProSe), implemented by a base station, the method comprising:
    receiving a request from a wireless transmit/receive unit (WTRU) to establish one or more ProSe bearers with another WTRU;
    receiving at least one aggregate maximum bit rate (AMBR) parameter from a network entity; and
    sending an indication to the WTRU, wherein the indication authorizes the WTRU to establish a ProSe communication over the one or more ProSe bearers, wherein the indication is based on at least the AMBR parameter.

2. The method of claim 1, wherein the request comprises priority information of the one or more ProSe bearers, determined by the WTRU.

3. The method of claim 1, wherein the request comprises one or more quality of service (QoS) requirements for the one or more ProSe bearers.

4. The method of claim 1, wherein the request comprises information regarding a communication mode.

5. The method of claim 1, wherein the at least one AMBR parameter comprises a maximum bit rate that the WTRU can use for data sent on the one or more ProSe bearers.

6. The method of claim 1, wherein the at least one AMBR is a configured subscription parameter.

7. The method of claim 1, wherein the at least one AMBR is provided to the network entity in response to a registration by the WTRU.

8. The method of claim 1, wherein the at least one AMBR parameter comprises a first AMBR parameter for uplink communications and a second AMBR parameter for downlink communications.

9. The method of claim 1, wherein the indication is further based on at least one of: priority information of the one or more ProSe bearers, one or more QoS requirements for the one or more ProSe bearers, or information regarding the communication mode.

10. The method of claim 1, wherein the network entity is a mobility management entity (MME).

11. A base station for use in wireless communication, the base station comprising:
   at least one antenna;
   a transceiver operatively coupled to the at least one antenna; and
   a processor, wherein:
   the transceiver and the processor are configured to receive a request from a wireless transmit/receive unit (WTRU) to establish one or more proximity services (ProSe) bearers with another WTRU;
   the transceiver and the processor are further configured to receive at least one aggregate maximum bit rate (AMBR) parameter from a network entity; and
   the transceiver and the processor are further configured to send an indication to the WTRU, wherein the indication is based on the at least one AMBR parameter, and wherein the indication authorizes the WTRU to establish a ProSe communication over the one or more ProSe bearers.

12. The base station of claim 11, wherein the request comprises priority information of the one or more ProSe bearers, determined by the WTRU.

13. The base station of claim 11, wherein the request comprises one or more quality of service (QoS) requirements for the one or more ProSe bearers.

14. The base station of claim 11, wherein the request comprises information regarding a communication mode.

15. The base station of claim 11, wherein the at least one AMBR parameter comprises a maximum bit rate that the WTRU can use for data sent on the one or more ProSe bearers.

16. The base station of claim 11, wherein the at least one AMBR is a configured subscription parameter.

17. The base station of claim 11, wherein the at least one AMBR is provided to the network entity in response to a registration by the WTRU.

18. The base station of claim 11, wherein the at least one AMBR parameter comprises a first AMBR parameter for uplink communications and a second AMBR parameter for downlink communications.

19. The base station of claim 11, wherein the indication is further based on at least one of: priority information of the one or more ProSe bearers, one or more QoS requirements for the one or more ProSe bearers, or information regarding the communication mode.

20. The base station of claim 11, wherein the network entity is a mobility management entity (MME).

\* \* \* \* \*